United States Patent [19]
Zegar et al.

[11] 4,426,350
[45] Jan. 17, 1984

[54] VALVE SUPPORT ARRANGEMENT FOR PRESSURIZER IN A NUCLEAR POWER PLANT

[75] Inventors: Martin J. Zegar, N. Huntingdon; Nicholas W. Kish, Munhall; Edward J. Rusnica, Greensburg; Howard S. Jenkins, Murrysville; Stephen J. Sarver, Pittsburgh, all of Pa.

[73] Assignee: Westinghouse Electric Corp., Pittsburgh, Pa.

[21] Appl. No.: 229,363

[22] Filed: Jan. 29, 1981

[51] Int. Cl.³ .............................................. G21C 9/00
[52] U.S. Cl. ..................................... 376/283; 376/203; 376/260; 376/307; 376/463
[58] Field of Search ............... 376/461, 283, 366, 361, 376/294, 384, 249, 307, 203, 260, 463

[56] References Cited
U.S. PATENT DOCUMENTS

| | | | |
|---|---|---|---|
| 3,127,046 | 3/1964 | Griffiths et al. | 376/294 |
| 3,171,790 | 3/1965 | Chollender et al. | 376/361 |
| 3,230,149 | 1/1966 | Boiron | 376/366 |
| 4,046,169 | 9/1977 | Pollono et al. | 376/461 |

Primary Examiner—Richard E. Schafer
Assistant Examiner—Daniel Wasil
Attorney, Agent, or Firm—E. F. Possessky

[57] ABSTRACT

A modularly constructable support arrangement is provided for pressurizer safety and relief valves in a nuclear power plant. A common header is supported by four sets of columnar legs which are secured to pressurizer vessel side wall lugs. The safety and relief valves are securely disposed and connected through short pipe runs to discharge steam into the header.

16 Claims, 5 Drawing Figures

VALVE SUPPORT ARRANGEMENT FOR PRESSURIZER IN A NUCLEAR POWER PLANT

BACKGROUND OF THE INVENTION

The present invention relates to pressurized water nuclear reactor power plants and more particularly to support arrangements for valves which are provided with the pressurizer to protect the plant against overpressure and thereby provide reliability for safe plant operation.

In a pressurized water nuclear power plant, a pressurizer is employed to provide relief for coolant overpressure. Typically, the pressurizer is a vertical, thick-walled vessel having a hemispherical head and having its bottom end supported by a flanged skirt.

In accordance with applicable code requirements, relief valves must be provided for a first level of overpressure protection and safety valves must be provided for a second level of overpressure protection.

The number and sizes of the protection valves are determined by requirements for the amount and speed of steam dumping. In turn, plant load rejection requirements determine steam dump requirements.

Generally, three safety valves, (typically 6" valves) and three relief valves (typically 3" valves) have been employed to meet steam dump requirements for 100% load rejection in all standard size power plants, i.e. all 2, 3 and 4 loop plants with 12 or 14 foot reactor cores. To provide for 80% load rejection, only two relief valves have normally been provided for the various plant sizes. The usual practice has also been to provide an isolation valve in series with each relief valve to provide for relief valve maintenance.

Normally, a single nozzle is provided in the pressurizer head for common connection to all the isolation and relief valves. However, a separate nozzle is normally provided in the pressurizer head for connection to each safety valve. Thus, plant safety is enhanced by the redundancy inherent in the multiple valve and multiple nozzle system design.

In the prior art, the piping and support arrangement for the relief and safety valves has been plant dependent. Typically, the plant architect/engineer has had the responsibility for designing (1) the piping runs from the nozzles to the valves and from the valves to the common downcomer and (2) the support arrangement for the piping and valve layout.

Architects/engineers have had problems in arranging and supporting the piping and valves to accommodate the large valve discharge forces while complying with allowable pressurizer load limits. In developing plant-by-plant designs for valve support arrangements which do meet overpressure protection performance requirements, a lack of standardization has resulted in a higher cost of plant construction, difficulties in valve maintenance and service, and valve availability and life which are less than may otherwise be possible with a standardized and well-planned valve support arrangement.

Discharge piping layout and design has become a uniquely costly effort especially since it has typically been dependent on the space available after other plant and system design needs have been met. Further, the design of valve support arrangements to meet earthquake protection standards has typically been made more complicated and more costly by structural ties of the support arrangement to the side wall of the containment vessel within which the pressurizer is disposed.

Due to space limitations on the discharge piping, almost every plant has required a different unique layout which cannot be duplicated in other plants. Because of this, excessive amounts of piping has been used to make the structure fit into the containment while meeting performance and structural requirements. Since each valve support arrangement more or less has been a tailor-made structure, costly job-to-job modifications and special analysis requirements have been imposed in the manufacture and installation of pressurizer valve supports. Moreover, additional supports have been needed to satisfy deadweight, hydraulic, thermal and seismic loads and these supports have frequently been tied into the concrete, further complicating the space/interference problem.

SUMMARY OF THE INVENTION

An arrangement for supporting a plurality of steam discharge valves for connection to nozzles in the head of pressurizer in a nuclear power plant, said support arrangement comprising a common header having piping with a discharge outlet, means for supporting each of said valves relative to said header in a position proximate to the header piping, pipe means for connecting each of said valves to a pressurizer nozzle and to the header piping, means for securing said header to a side wall of the pressurizer vessel.

DESCRIPTION OF THE PREFERRED EMBODIMENT

Figure 1:
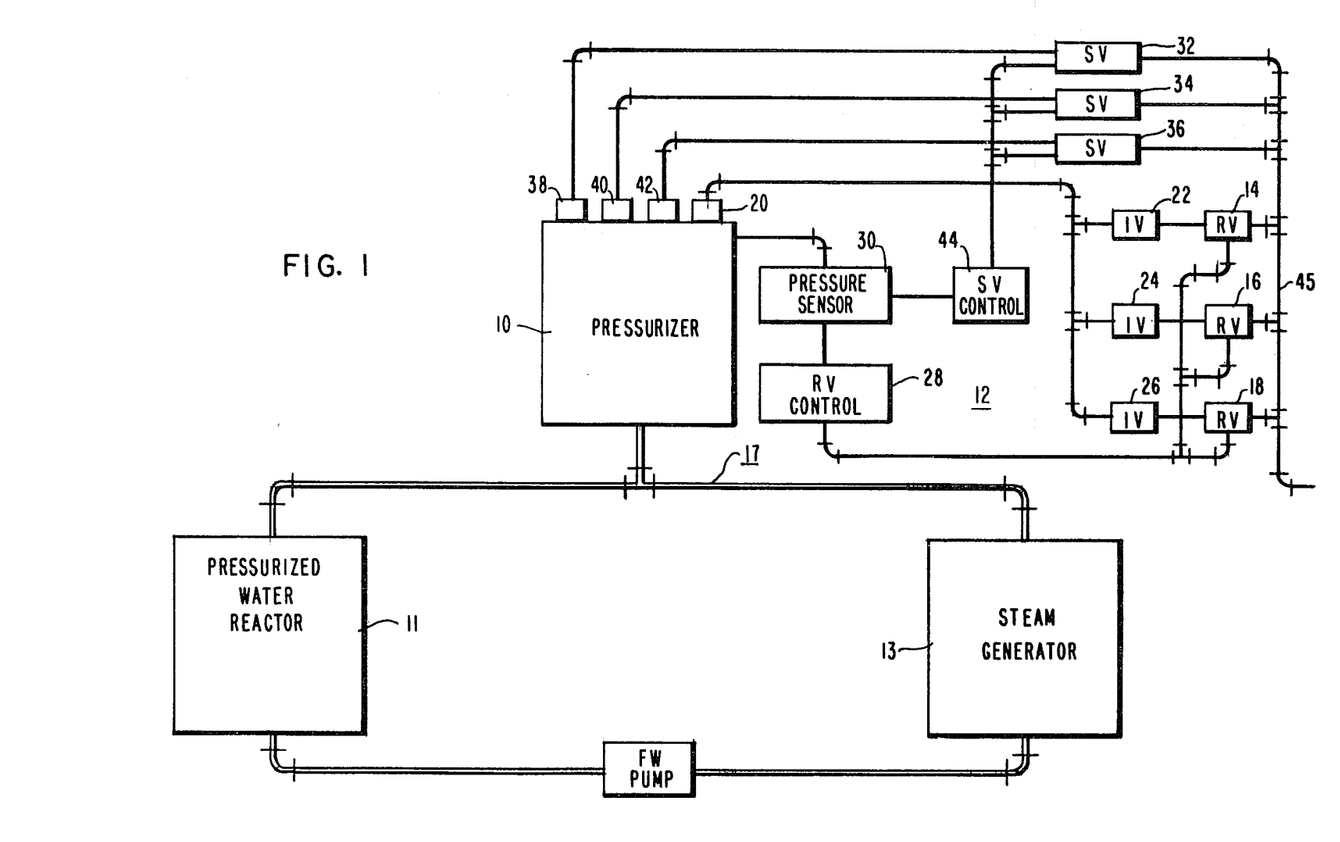
FIG. 1 shows a schematic view of a nuclear power plant in which a pressurizer having safety and relief valves is employed.

More particularly, there is shown in FIG. 1 a schematic diagram of a pressurizer 10 and its overpressure valve protection system 12 in a nuclear power plant. The plant is provided with a pressurized water reactor 11 where coolant water is heated under pressure for delivery to a steam generator 13 and return through a feedwater pump 15 in a coolant loop 17. Other coolant loops (not shown) are also provided for the reactor 10 but normally only a single pressurizer 10 is provided in one of the coolant loops. The pressurizer 10 provides coolant volume for relief of reactor coolant overpressure for injection of reactor coolant into the loop 17 as needed to maintain reactor coolant pressure.

The valve protection system 12 in this case includes three pressure relief valves 14, 16 and 18 which are connected to a common pressurizer head nozzle 20 to produce relief steam outflow when operating conditions require. Respective isolation valves 22, 24 and 26 are connected in series with the relief valves 14, 16 and 18 to provide for disconnection of the relief valves when relief valve maintenance is needed.

The relief valves 14, 16 and 18 are motor-operated to open under the control of a conventional valve control 28 when steam pressure within the pressurizer 10 reaches a first overpressure value at which first level protection is needed for pressure regulation and safety purposes. One or more suitable pressure sensors 30 (typically four sensors 30 would be provided) are positioned in the pressurizer head to produce signals indicative of the steam pressure for use in operation of the valve control 28.

Similarly in this case, three safety valves 32, 34 and 36 are connected to respective pressurizer head nozzles 38, 40 and 42 to provide safety steam outflow when operating conditions so require. A conventional valve control 44 opens the safety valves when the pressure sensors 30 indicate that the steam overpressure has reached a second overpressure value which is higher than the first one and which requires massive outflow of steam for safety reasons.

In the usual nuclear plant, the connection piping for the relief valves would be 3" piping. The safety valve piping would normally be 6" piping. Outlet flow from all of the overpressure valves is usually commonly connected and supplied to a downcomer tube 45 for ultimate discharge.

To design a conventional support arrangement for the valves and piping in a particular power plant, the architect/engineer has had the following objectives:

1. Support the valves against discharge forces produced by steam outflow.
2. Provide piping and valve integrity against earthquake forces transmitted through support members connected to ground-based structure.
3. Place valves in limited available space for maintenance accessibility.
4. Place valves in a limited space to minimize personnel radiation exposure during maintenance.
5. Try to minimize the cost of support structure for the particular plant.
6. Make the structure generally usable independent of plant site with minimum customer design interface requirements, and with general use justification based on a single general structural design analysis.
7. Make the structure capable of modular construction with field assembly.

As already noted, the very use of the architect/engineer approach in the design of the pressurizer valve support arrangement in the prior art has led to higher costs and generally reduced the extent to which objectives have been able to be achieved because of the special effort required for each plant and the lack of a well-conceived standardized structural arrangement.

As shown in FIGS. 2-5, a pressurizer valve support arrangement 50 is structured in accordance with the principles of the present invention to provide improved achievement of performance objectives while providing improved manufacturing and maintenance servicing economy. These invention benefits result from the fact that the arrangement 50 can be used as a standard subsystem from power plant to power plant. Further, the arrangement 50 can be readily modularized for economic factory manufacture and field assembly.

Figure 2:
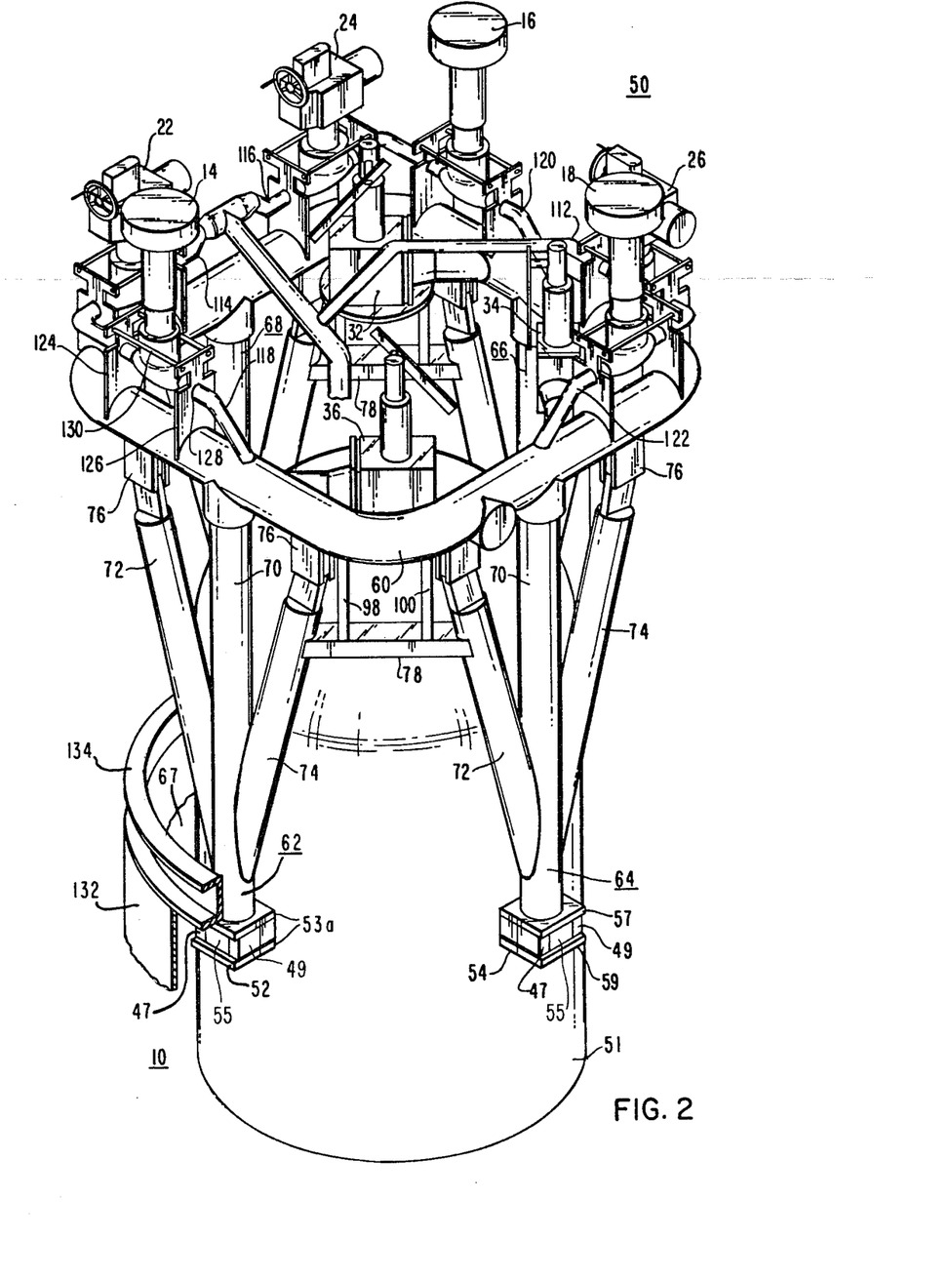
FIG. 2 shows a perspective view of an arrangement for supporting the relief and safety valves in accordance with the principles of the invention.
Figure 5:
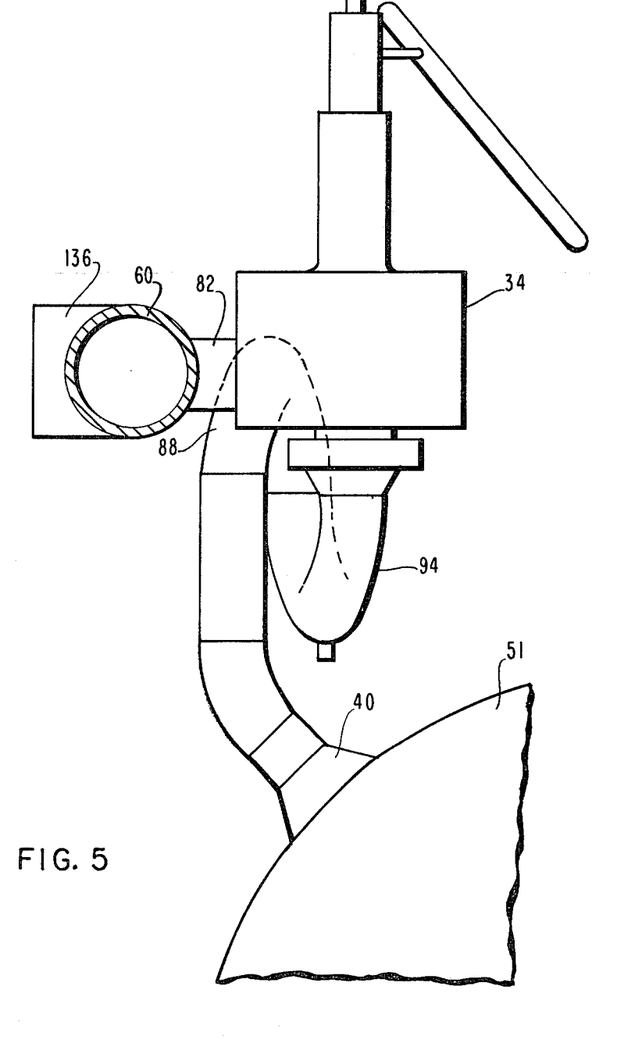
FIG. 5 shows an enlarged partial elevation view illustrating a seal loop employed with the valves.

The valve support arrangement 50 is preferably provided with primary support only by the pressurizer 10 to avoid the added protection burden which otherwise exists if earthquake shock is transmitted through both the pressurizer structure and the pressurizer containment vessel structure in the conventional arrangement where valve supports are provided on both the containment and the pressurizer vessel. Further, it is preferred that the pressurizer primary support be provided by the pressurizer side wall 51 as opposed to a head 67 of the pressurizer. Thus, in this case as shown in FIGS. 2 and 5, a total of four brackets 52, 54, 56 and 58 are equally spaced about the pressurizer side wall periphery and rigidly welded or otherwise secured to the pressurizer side wall 51.

Figure 3:
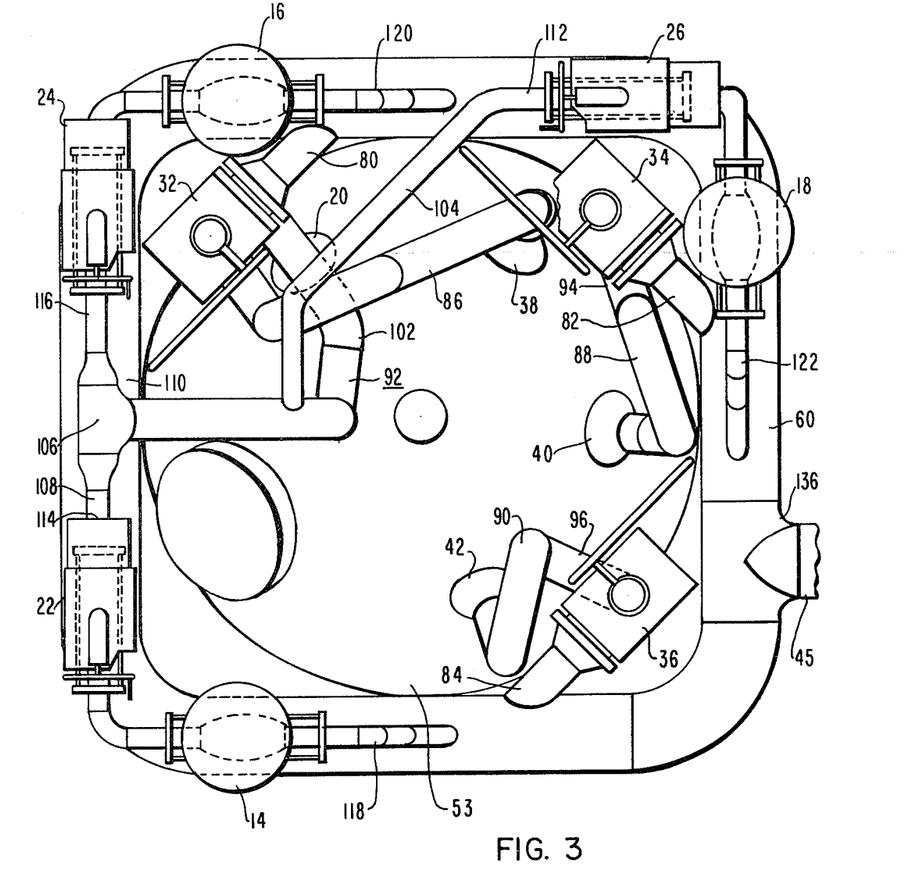
FIG. 3 shows a top plan view of the valve support arrangement.
Figure 4:
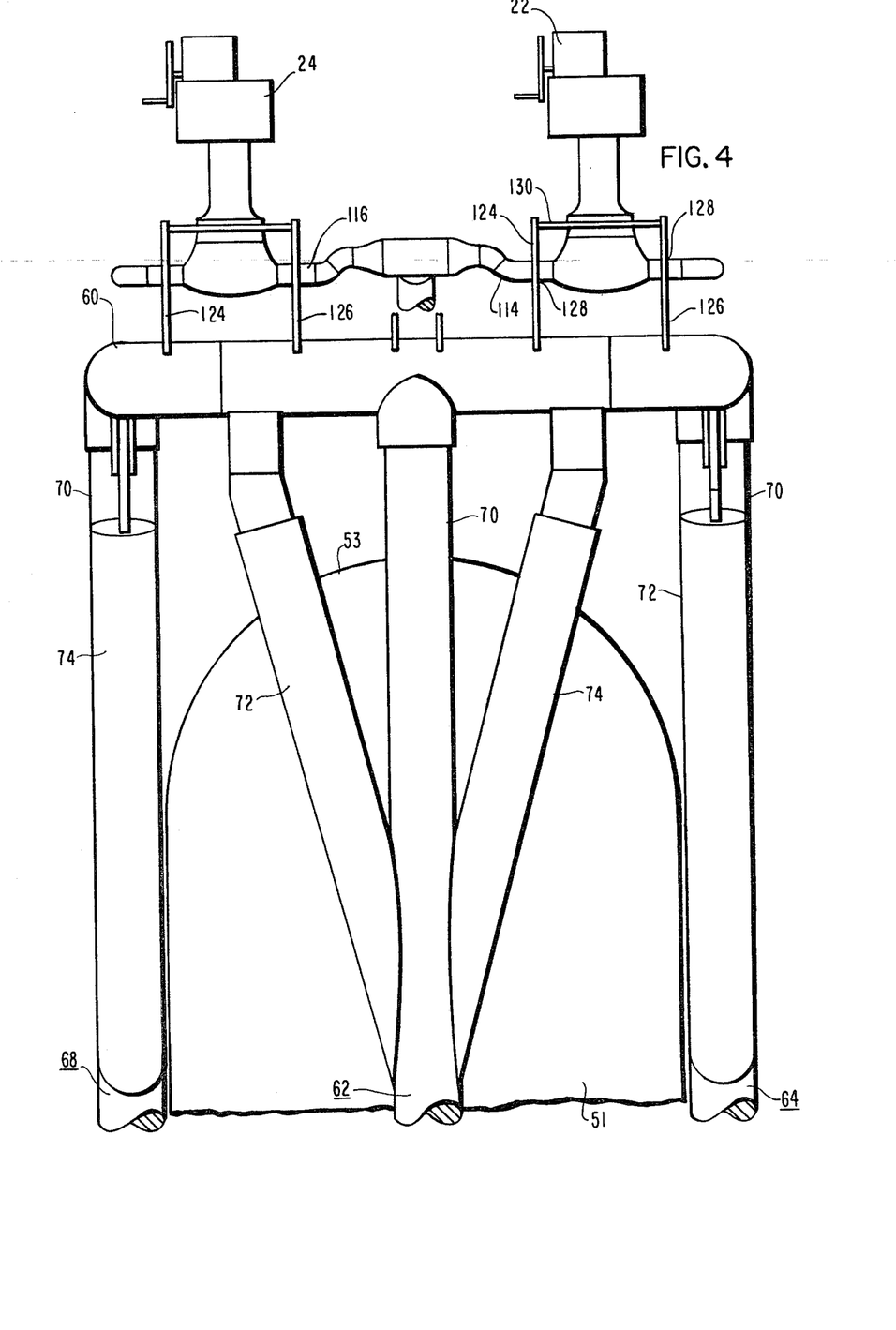
FIG. 4 shows the top portion of the pressurizer and valve support arrangement in an elevation view.

The valve support arrangement 50 includes a common ring header 60 disposed above the pressurizer head 67 and supported on the respective brackets 52, 54, 56 and 58 by respective columnar supports 62, 64, 66 and 68. The header 60 enables relatively short pipe runs to be used in collecting steam from the various pressurizer head nozzles for delivery through the relief and safety valves to a common collector, i.e., to a downcomer tube 45 (FIG. 3).

The header 60 is preferably a ring-type unit and provides a common flow discharge from the head nozzles through the various valves disposed about the pressurizer head 67. Without header collection as described relatively, long individual pipe runs are typically required from each nozzle through its valve to the common downcomer discharge collector thereby disadvantageously occupying limited work space with pipe structure that reduces accessibility for valve maintenance and makes shielding for reduced radiation exposure difficult at best.

The ring header 60 can, for example, be formed from 12" piping to provide for the common path for flow discharge from the relief and safety valves. The downcomer tube 45 is field connected to the header 60 to carry the discharge away from the pressurizer 10.

Generally, the relief and safety valves are supported within and above the envelope of the common ring header 60 so that relatively short direct pipes can be used to provide for efficient valve steam collection in the header 60 while providing usage of space above the pressurizer head 53 which enables convenient valve access to be provided for valve maintenance and which enable radioactive shielding to be provided conveniently between the pressurizer head 67 and the valve spaces above the head 67 to provide reduced personnel radiation exposure during the performance of valve maintenance.

In this way, reduced discharge pipe length also leads to reduced discharge pressure drops and some resultant cost advantages in pipe design for reduced stress. Further, the arrangement of the valves within and above the header 60 provides added missile protection for the valves from missiles which may accidentally be released from a point below the pressurizer head 67 within the containment vessel.

Each bracket 52, 54, 56 and 58 comprises a pair of spaced lugs 47, 49 which are welded or otherwise attached to the vessel side wall and project outwardly therefrom. A support pad 53a is included at the bottom of each columnar support 62, and it is provided with an H cross section, with a vertical crossbar 55 disposed to fit between the vessel lugs 47 and 49 and horizontal lugs 57 and 59 disposed to rest respectively on the upper and lower sides of the vessel lugs 47, 49.

Each of the columnar supports 62, 64, 66 and 68 includes a core column 70 which is secured, as by welding, to its support pad 53a, which in turn is welded or otherwise secured to the associated vessel lugs 47, 49. Each core column extends vertically upward to its upper end where it is secured to the header 60. In the preferred embodiment, a short tubular coupling is formed on the header 60 and extends downwardly over and about each core column 70 for attachment or welding thereto.

To provide added distributed and rigidifying support for the head 60, two columnar struts 72 and 74 are welded or otherwise secured to and extend upwardly from the base of each core column 70 at an angle to the vertical for attachment to brackets 76 extending downwardly from the header 60. Preferably, three crossbeams 78 extend horizontally between struts 72 and 74 of adjacent column supports 62, (1) to provide protective support structure on which the respective stop valves 32, 34, 36 (FIG. 3) can be placed above the pressurizer head 53 and (2) to rigidify further the overall valve support structure.

Support for all of the steam discharge valves above the pressurizer is provided by the columnar support structure which is supported by the pressurizer side wall through the vessel lugs without any need for support by external containment wall structure. As a result, earthquake force transmittal occurs only through the pressurizer structure and earthquake force requirements are accordingly reduced somewhat.

Each safety valve 32, 34 or 36 is preferably disposed within the common header envelope and near a corner of the header 60 in proximity to its associated pressurizer nozzle. FIG. 3 provides the best illustration of this valve layout. The safety valves are angle valves as is typically the case, but in-line valves can be employed if desired.

Further, each safety valve is preferably oriented so that its discharge pipe 80, 82 or 84 is angled at approximately 45° to the common manifold or header piping. As a result, valve discharge forces on the header 60 are relatively reduced and a known and predictable direction is provided for steam flow.

Because of the safety valve placement, a short run of pipe 86, 88 or 90 is all that is needed to couple the vessel head nozzles 38, 40, 42 to the inlets of the safety valves 32, 34 and 36. Preferably, a separate loop seal is provided for each safety valve 38, 40 or 42 by the placement of a trap 92, 94 or 96 near the inlet of each safety valve 32, 34 or 36.

A water loop valve seal is provided by a trap since a condensation point is provided where a slug of water is collected during normal plant operation. Steam pressure forces the water slug against the closed valve, and the valve seat is thus buffered against the corrosive and warping effects of steam during normal plant operation. If the safety valve is opened for steam pressure protection, the water slug is blown through the valve to flash to steam as the pressurizer steam discharges.

Support for the three safety valves 32, 34 and 36 is directly provided by the respective crossbeams 78 as already indicated. A pair of upwardly projecting legs 98, 100 are provided on each beam 78 for secured support of the associated safety valve in its described position. This support structure provides for simplicity of water seal design and shortened moment arms for reverse discharge thrust.

Each of the three relief valves and its associated in-line isolation valve is preferably an in-line valve and preferably supported in a position directly above the header. Since all relief, isolation and safety valves are placed directly above the header 60 or near a corner of the header 60 yet within the header envelope, the limited space within the header envelope is generally opened up to make blanket radioactive shielding much easier and to make the valves, instrumentation, etc. more accessible for maintenance and inspection purposes.

Further, as observed in FIG. 3, the nozzle-to-valve pipe runs are generally short and appropriately positioned to keep the limited space open for maintenance and inspection accessibility. Typically, the header 60 would envelope an area of about 100 square feet. Short pipe runs from all of the nozzles to the discharge valves also enable smaller pressure and smaller thermal drops to be experienced in the pipes thereby leading to reduced stress requirements in pipe design.

The relief nozzle is coupled to the relief valves 14, 16 and 18 through a short common pipe run 102 from which a branch pipe 104 is directed to the isolation and relief valves 26 and 18. The common pipe 102 is coupled to a T-connector 106 from which short pipe runs 108 and 110 are directed over and along the header 60 respectively to the isolation and relief valves 22, 14 and 24, 16. As observed in FIG. 2, respective traps 112, 114 and 116 are provided in the pipes 104, 108, 110 for the respective sets of isolation and relief valves for valve seat buffering reasons as described in connection with the safety valves.

In-line discharge pipes 118, 120 and 122 from the relief valves 14, 16 and 18 are directed for a short distance along the underlying header pipes and directed preferably at a 45° angle to be coupled to the header pipe. Valve discharge force is thus minimized and directivity of discharge flow is made predictable as described in connection with the safety valves.

Suitable upwardly projecting pairs of legs 124 and 126 are provided to support each isolation and relief valve, preferably directly over the header piping. Each leg 124, 126 is welded or otherwise secured to the header piping and is appropriately structured at its upper end as indicated by reference characters 128 and 130 to support directly the inlet or outlet pipe near the valve itself and to provide lateral support for the upwardly extending valve body against twisting movement.

Appropriate instrumentation and signal lines and the like (not detailed in the drawings) are also disposed within the header envelope and above the pressurizer head 67.

An envelope of thermal insulation 132 is suspended from pressurizer side wall lugs 134 of the type previously used as support for discharge piping near the pressurizer head 67. In this way, the gravitational load of the conventional energy conserving insulation 132 is placed on the pressurizer side wall rather than the pressurizer head 53 as has been the case with the typical head crown support approach of the prior art.

The described structure generally facilitates maintenance and inspection because all valves are essentially at one level. Walkways (not shown) can be readily disposed within the header space for personnel to move around the pipe and valve structure. Radioactive shielding blanketing (not shown) can be readily disposed over the pressurized head and beneath the walkways as already considered (typical radioactive exposure without blanketing would be 800 to 900 millirems which limits work time to about 1 hour unless protective suiting is used).

In summary, the valve support arrangement of the detailed embodiment includes a square manifold of twelve-inch piping into which steam from the safety and pressure relief valves is discharged. Each safety valve is connected to its pressurizer nozzle through a six-inch line loop seal arrangement. The safety valve steam discharge is made directly into the common header.

The nozzle connection for the relief valves is made through a common six-inch piping arrangement. Connectors split the relief flow into three paths, one for each pressure relief valve. The piping from the connectors to each relief valve is three-inch piping. Each pressure relief path consists of the three-inch piping, a motor-operated isolation or gate valve and a pressure relief valve. Discharge from each pressure relief valve is made into the twelve-inch manifold.

Vertical support is provided for the header by four columns, positioned 90° apart, which are supported by pads on the vessel side wall lugs. A common header discharge tee 136 can be located by the user anywhere along the common header for connection to the downcomer. The arrangement is unique especially in that it lends itself to a generic structural analysis, incorporates pipe and valve supports in an integral package and is site independent.

The product is further commercially significant in that it requires a minimum of customer/architect/engineer interface, enables ease of routine valve maintenance, is in-service inspectable and lends itself to modular construction. The valve support structure efficiently withstands steam discharge forces while providing the described maintenance advantages. Valve seal protection is provided and earthquake forces are limited to those transmitted through the pressurizer vessel.

All piping may be austenitic stainless steel and the columnar supports may be carbon steel. The support arrangement readily lends itself to modular construction, i.e., it may be pre-fabricated in five pieces as one example. The twelve-inch header and three-inch relief piping and associated valves can be one complete subassembly. The six-inch piping for the safety valves can be fabricated in four subassemblies with excess pipe length provided for accommodation of loose tolerance on the pressurizer nozzle orientations. The columnar supports may also be pre-cut and pre-fabricated.

What is claimed is:

1. An arrangement for supporting a plurality of steam discharge valves for connection to nozzles in the head of pressurizer in a nuclear power plant, said support arrangement comprising a common header having piping with a discharge outlet, means for supporting each of said valves relative to said header in a position proximate to the header piping, pipe means for connecting each of said valves to a pressurizer nozzle and to the header piping, means for securing said header to a side wall of the pressurizer vessel.

2. A valve support arrangement as set forth in claim 1 wherein said header securing means comprises a plurality of vertical support means having bottom portions thereof secured to the pressurizer side wall and having top portions thereof secured to said header with said header disposed above the pressurizer head.

3. A valve support arrangement as set forth in claim 1 wherein said header is the ring type and each of said valves is positioned substantially with the peripheral envelope of said header.

4. A valve support arrangement as set forth in claim 3 wherein said header securing means comprises a plurality of vertical columnar support means having top portions thereof secured to said header with said header disposed above the pressurizer head, and lug means are provided for securing a bottom portion of each of said columnar means to the pressurizer side wall.

5. A valve support arrangement as set forth in claim 2 wherein each of said vertical support means comprises a core secured to said header and the pressurizer side wall, and a pair of struts extending angularly upwardly between said core member and said header to provide more distributed support of said header.

6. A valve support arrangement as set forth in claim 2 wherein the discharge valves include a plurality of safety valves and a plurality of isolation and relief valves, and crossbeam means are secured to and extend between adjacent vertical support means, and means are provided for supporting each of said safety valves on one of said crossbeam means.

7. A valve support arrangement as set forth in claim 5 wherein the discharge valves include a plurality of safety valves and a plurality of isolation and relief valves, and crossbeam means are secured to and extend between struts of adjacent vertical support means, and means are provided for supporting each of said safety valves on one of said crossbeam means.

8. A valve support arrangement as set forth in claim 3 wherein the discharge valves include a plurality of safety valves and a plurality of isolation and relief valves, each of said relief valves and an associated isolation valve are supported substantially directly above the ring piping of said header.

9. A valve support arrangement as set forth in claim 6 wherein said header is the ring type, each of said relief valves and an associated isolation valve are supported substantially directly above the ring piping of said header, and wherein each of said valves is positioned susbstantially within the peripheral envelope of said header.

10. A valve support arrangement as set forth in claim 1 wherein the discharge valves include a plurality of safety valves and a plurality of isolation and relief valves, means are provided for supporting each of said relief valves and an associated isolation valve relative to the pipe means connected therefrom to said pressurizer so that a water seal is created against the relief valve seat during normal operation.

11. A valve support arrangement as set forth in claim 10 wherein said header is the ring type and each of said valves is positioned substantially with the peripheral envelope of said header, each of said relief valves and an associated isolation valve are supported substantially directly above the ring piping of said header.

12. A valve support arrangement as set forth in claim 2 wherein the discharge valves include a plurality of safety valves and a plurality of isolation and relief valves, and means are provided for supporting each of said safety valves relative to the pipe means connected therefrom to said pressurizer so that a water seal is provided against the safety valve seat during normal operation.

13. A valve support arrangement as set forth in claim 12 wherein crossbeam means are secured to and extend between adjacent vertical support means and means are provided for supporting each of said safety valves on one of said crossbeam means, and wherein said header is the ring type and each of said valves is positioned substantially with the peripheral envelope of said header.

14. A valve support arrangement as set forth in claim 3 wherein said ring-type header has substantially square ring form and wherein the discharge valves include a plurality of safety valves and a plurality of isolation and relief valves, and crossbeam means are secured to and extend between adjacent vertical support means, and means are provided for supporting each of said safety valves on one of said crossbeam means, and each of said safety valves is disposed in a corner space within the header envelope.

15. A valve support arrangement as set forth in claim 1 wherein said connecting pipe means between said valves and said header is positioned to discharge steam into said header at or near an angle of 45° to the header piping direction.

16. A valve support arrangement as set forth in claim 1 wherein lug means are disposed on the pressurizer side wall near the pressurizer head for supporting a pressurizer insulation blanket.

* * * * *